US010987588B2

(12) United States Patent
Lowrey et al.

(10) Patent No.: US 10,987,588 B2
(45) Date of Patent: *Apr. 27, 2021

(54) SYSTEM AND METHOD FOR OPTIMIZING VIRTUAL GAMES

(71) Applicant: Activision Publishing, Inc., Santa Monica, CA (US)

(72) Inventors: Parker E. Lowrey, Tarzana, CA (US); Christian K. Widmer, Los Angeles, CA (US); Brian S. Feldstein, Playa Vista, CA (US); Stephen A. Lang, Lyons, CO (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,718

(22) Filed: Nov. 7, 2019

(65) Prior Publication Data

US 2020/0171388 A1 Jun. 4, 2020

Related U.S. Application Data

(63) Continuation of application No. 15/588,000, filed on May 5, 2017, now Pat. No. 10,500,498.
(Continued)

(51) Int. Cl.
*A63F 13/60* (2014.01)
*A63F 13/69* (2014.01)
(Continued)

(52) U.S. Cl.
CPC .............. *A63F 13/60* (2014.09); *A63F 13/67* (2014.09); *A63F 13/69* (2014.09); *A63F 13/537* (2014.09)

(58) Field of Classification Search
CPC .......... A63F 13/60; A63F 13/69; A63F 13/67; A63F 13/79; A63F 13/537; G07F 17/3244
See application file for complete search history.

(56) References Cited

U.S. PATENT DOCUMENTS 4,461,301 A 7/1984 Ochs
4,908,761 A 3/1990 Tai
(Continued)

FOREIGN PATENT DOCUMENTS

CA 2143874 6/2000
CA 2292678 7/2005
(Continued)

OTHER PUBLICATIONS www.hattrick.org rules section Jul. 1, 2009.
(Continued)

*Primary Examiner* — Jasson H Yoo
(74) *Attorney, Agent, or Firm* — Novel IP

(57) ABSTRACT

The present specification describes an assistive tool that facilitates the design of video games to achieve a true randomized, non-biased and neutral gaming environment that is bounded so that extremes of disincentives and excess incentives are avoided. In one embodiment, the tool allows for simulation of game environment and generates variables that enable reward acquisition by players. In one embodiment, the tool allows the game systems to be defined in such a way that an agent, such as an artificial player implemented by a computer program, can interact with the game environment. In one embodiment, the present tool uses generative models driven by data from previous versions of a game to define the behavior of such agents in simulated games.

20 Claims, 12 Drawing Sheets

Related U.S. Application Data

(60) Provisional application No. 62/427,674, filed on Nov. 29, 2016.

(51) Int. Cl.
*A63F 13/67* (2014.01)
*A63F 13/537* (2014.01)

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |

(56) References Cited

U.S. PATENT DOCUMENTS

| | | |
|---|---|---|
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,763,273 B2 | 7/2004 | Chudley |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |

(56) References Cited

U.S. PATENT DOCUMENTS

| | | | |
|---|---|---|---|
| 7,997,987 | B2 | 8/2011 | Johnson |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |
| 8,184,116 | B2 | 5/2012 | Finn |
| 8,185,450 | B2 | 5/2012 | McVey |
| 8,185,829 | B2 | 5/2012 | Cannon |
| 8,187,067 | B2 | 5/2012 | Hamilton, II |
| 8,199,145 | B2 | 6/2012 | Hamilton, II |
| 8,203,561 | B2 | 6/2012 | Carter |
| 8,214,335 | B2 | 7/2012 | Hamilton, II |
| 8,214,433 | B2 | 7/2012 | Dawson |
| 8,214,750 | B2 | 7/2012 | Hamilton, II |
| 8,214,751 | B2 | 7/2012 | Dawson |
| 8,217,953 | B2 | 7/2012 | Comparan |
| 8,219,616 | B2 | 7/2012 | Dawson |
| 8,230,045 | B2 | 7/2012 | Kawachiya |
| 8,230,338 | B2 | 7/2012 | Dugan |
| 8,233,005 | B2 | 7/2012 | Finn |
| 8,234,234 | B2 | 7/2012 | Shearer |
| 8,234,579 | B2 | 7/2012 | Do |
| 8,239,775 | B2 | 8/2012 | Beverland |
| 8,241,131 | B2 | 8/2012 | Bhogal |
| 8,245,241 | B2 | 8/2012 | Hamilton, II |
| 8,245,283 | B2 | 8/2012 | Dawson |
| 8,265,253 | B2 | 9/2012 | D Amora |
| 8,310,497 | B2 | 11/2012 | Comparan |
| 8,334,871 | B2 | 12/2012 | Hamilton, II |
| 8,360,886 | B2 | 1/2013 | Karstens |
| 8,364,804 | B2 | 1/2013 | Childress |
| 8,425,326 | B2 | 4/2013 | Chudley |
| 8,442,946 | B2 | 5/2013 | Hamilton, II |
| 8,489,925 | B1 | 7/2013 | Antukh |
| 8,496,531 | B2 | 7/2013 | Youm |
| 8,506,372 | B2 | 8/2013 | Chudley |
| 8,514,249 | B2 | 8/2013 | Hamilton, II |
| 8,554,841 | B2 | 10/2013 | Kurata |
| 8,607,142 | B2 | 12/2013 | Bergman |
| 8,607,356 | B2 | 12/2013 | Hamilton, II |
| 8,624,903 | B2 | 1/2014 | Hamilton, II |
| 8,626,836 | B2 | 1/2014 | Dawson |
| 8,692,835 | B2 | 4/2014 | Hamilton, II |
| 8,696,465 | B2 | 4/2014 | Gatto |
| 8,721,412 | B2 | 5/2014 | Chudley |
| 8,790,185 | B1* | 7/2014 | Caldarone .............. A63F 13/10 463/42 |
| 8,827,816 | B2 | 9/2014 | Bhogal |
| 8,838,640 | B2 | 9/2014 | Bates |
| 8,849,917 | B2 | 9/2014 | Dawson |
| 8,911,296 | B2 | 12/2014 | Chudley |
| 8,992,316 | B2 | 3/2015 | Smith |
| 9,083,654 | B2 | 7/2015 | Dawson |
| 9,152,914 | B2 | 10/2015 | Haggar |
| 9,205,328 | B2 | 12/2015 | Bansi |
| 9,286,731 | B2 | 3/2016 | Hamilton, II |
| 9,299,080 | B2 | 3/2016 | Dawson |
| 9,364,746 | B2 | 6/2016 | Chudley |
| 9,525,746 | B2 | 12/2016 | Bates |
| 9,583,109 | B2 | 2/2017 | Kurata |
| 9,682,324 | B2 | 6/2017 | Bansi |
| 9,764,244 | B2 | 9/2017 | Bansi |
| 9,789,406 | B2 | 10/2017 | Marr |
| 9,795,887 | B2 | 10/2017 | Lin |
| 9,808,722 | B2 | 11/2017 | Kawachiya |
| 9,827,488 | B2 | 11/2017 | Pearce |
| 9,942,013 | B2 | 4/2018 | Malladi |
| 10,500,498 | B2* | 12/2019 | Lowery .................. A63F 13/67 |
| 2001/0032240 | A1 | 10/2001 | Malone |
| 2002/0002514 | A1 | 1/2002 | Kamachi |
| 2002/0007319 | A1 | 1/2002 | Yu |
| 2002/0026388 | A1 | 2/2002 | Roebuck |
| 2002/0035480 | A1 | 3/2002 | Gordon |
| 2002/0035593 | A1 | 3/2002 | Salim |
| 2002/0043568 | A1 | 4/2002 | Hess |
| 2002/0065870 | A1 | 5/2002 | Baehr-Jones |
| 2002/0095586 | A1 | 7/2002 | Doyle |
| 2002/0096831 | A1 | 7/2002 | Nakayama |
| 2002/0097856 | A1 | 7/2002 | Wullert |
| 2002/0116466 | A1 | 8/2002 | Trevithick |
| 2002/0124137 | A1 | 9/2002 | Ulrich |
| 2002/0130904 | A1 | 9/2002 | Becker |
| 2002/0135618 | A1 | 9/2002 | Maes |
| 2002/0169665 | A1 | 11/2002 | Hughes |
| 2002/0184373 | A1 | 12/2002 | Maes |
| 2002/0184391 | A1 | 12/2002 | Phillips |
| 2002/0188688 | A1 | 12/2002 | Bice |
| 2003/0008712 | A1 | 1/2003 | Poulin |
| 2003/0014297 | A1 | 1/2003 | Kaufman |
| 2003/0032476 | A1 | 2/2003 | Walker |
| 2003/0050977 | A1 | 3/2003 | Puthenkulam |
| 2003/0055892 | A1 | 3/2003 | Huitema |
| 2003/0056002 | A1 | 3/2003 | Trethewey |
| 2003/0076353 | A1 | 4/2003 | Blackstock |

(56) References Cited

U.S. PATENT DOCUMENTS

| | | |
|---|---|---|
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0076527 A1 | 3/2008 | Low |
| 2008/0096623 A1 | 4/2008 | Fujii |
| 2008/0113815 A1 | 5/2008 | Weingardt |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0113448 A1 | 4/2009 | Smith |
| 2009/0137320 A1 | 5/2009 | Kimura |
| 2009/0253494 A1 | 10/2009 | Fitch |
| 2009/0325711 A1 | 12/2009 | Bronstein |
| 2010/0304839 A1 | 12/2010 | Johnson |
| 2010/0306672 A1 | 12/2010 | McEniry |
| 2011/0190063 A1 | 8/2011 | Kajii |
| 2011/0201395 A1 | 8/2011 | Bansi |
| 2012/0010734 A1 | 1/2012 | Youm |
| 2012/0021825 A1 | 1/2012 | Harp |
| 2012/0122552 A1 | 5/2012 | Youm |
| 2013/0252737 A1 | 9/2013 | Mescon |
| 2013/0288766 A1* | 10/2013 | Terashima ............ A63F 13/12 463/16 |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0162763 A1 | 6/2014 | Kim |
| 2014/0162781 A1 | 6/2014 | Butler |
| 2014/0274402 A1 | 9/2014 | Michel |
| 2014/0344725 A1 | 11/2014 | Bates |
| 2014/0349753 A1 | 11/2014 | Imai |
| 2015/0031440 A1* | 1/2015 | Desanti ................. A63F 13/69 463/25 |
| 2015/0038233 A1 | 2/2015 | Rom |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0191671 A1 | 6/2016 | Dawson |
| 2016/0296840 A1 | 10/2016 | Kaewell |
| 2018/0169515 A1 | 6/2018 | Rice |

FOREIGN PATENT DOCUMENTS

| | | |
|---|---|---|
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |

(56) References Cited

FOREIGN PATENT DOCUMENTS

| | | |
|---|---|---|
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 0813132 B1 | 1/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Ma et al., "A Scalable Parallel Cell-Projection Volume Rendering Algorithm for Three-Dimensional Unstructured Data", IEEE 1997, pp. 1-10.
Hassen et al., "A Task-and Data-Parallel Programming Language Based on Shared Objects," ACM Transactions on Programming Languages and Systems, vol. 20, No. 6, Nov. 1998, pp. 1131-1170.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.
Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
International Search Report as Published as WO2005/079538 in corresponding international application No. PCT/US2005/005550, dated Jul. 5, 2006.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumb-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
Lee et al., "A Self-Adjusting Data Distribution Mechanism for Multidimensional Load Balancing in Multiprocessor-Based Database Systems," Information Systems vol. 19, No. 7, pp. 549-567, 1994.

(56) References Cited

OTHER PUBLICATIONS

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Andert, "A Simulation of Dynamic Task Allocation in a Distributed Computer System," Proceedings of the 1987 Winter Simulation Conference, 1987, pp. 1-9.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
"Universally Unique Identifier", 2006 (http://en.wikipedia.org/wiki/UUID).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

\* cited by examiner

| | Rank | | | | | % | | | | | | | |
|---|---|---|---|---|---|---|---|---|---|---|---|---|---|
| rare | Rank 32 | 72 | 14 | 245 | 880 | 1% | Rare Cosmetics | Rare Weapon Camos | Rare Weapon Standard | Legendary Currency | 0 | 2 | 0 |
| rare | Rank 34 | 83 | 16 | 105 | 1065 | 1% | Common Weapon Standard | Common Cosmetics | Rare Cosmetics | Rare Currency | 1 | 3 | 0 |
| rare | Rank 36 | 93 | 18 | 190 | 1285 | 1% | Common Currency | Common Currency | Rare Currency | Common Currency | 1 | 3 | 0 |
| rare | Rank 38 | 103 | 20 | 535 | 1325 | 1% | Common Cosmetics | Legendary Weapon Standard | Rare Weapon Standard | Epic Currency | 1 | 3 | 1 |
| rare | Rank 40 | 115 | 22 | 305 | 1945 | 2% | Legendary Currency | Rare Currency | Rare Weapon Camos | Common Currency | 1 | 3 | 1 |
| rare | Rank 42 | 127 | 24 | 470 | 2175 | 2% | Legendary Currency | Common Cosmetics | Legendary Cosmetics | Legendary Currency | 1 | 3 | 1 |

Player Metrics (Other)
DOM fraction (vs. TDM): [0.5]
Win Percentage: [0.5]
Launch

FIG. 8 (Cont.)

SYSTEM AND METHOD FOR OPTIMIZING VIRTUAL GAMES

CROSS-REFERENCE

The present application is a continuation application of U.S. patent application Ser. No. 15/588,000, entitled "System and Method for Optimizing Virtual Games" and filed on May 5, 2017, which relies on U.S. Patent Provisional Application No. 62/427,674, of the same title and filed on Nov. 29, 2016, for priority, both of which are herein incorporated by reference in their entirety.

FIELD

The present specification is related generally to the field of gaming, animation and computer graphics. More specifically the present specification is related to a software application that can be used by developers to design video games in a manner that optimizes user engagement and retention.

BACKGROUND

In certain role-playing video games, players control the actions of one or more characters, with the objective of developing unique character profiles that accumulate various objects and abilities through extended play. The rules for how quickly, how many, and what type of abilities are obtained and/or how quickly, how many, and what type of objects a character may find or receive involve several different variables, ratings or statistics, collectively parameters. These parameters determine the outcome of various chance or future events that lead to new objects and abilities.

The proper selection of these parameters is very challenging, however. First, video games may have an endpoint where the user's enjoyment stagnates because the user has achieved the biggest challenge possible or has used all of the assets available to him or her in achieving an objective. Users also have a tendency to be discouraged if they do not win or acquire any assets in a few consecutive games, if they perceive a game level to be too complex, or if the game rewards are not forthcoming. Additionally, some players are not always engaged, playing only intermittently. Especially in the smart device market segment, players are very time sensitive and tend to skip or switch to another game, application, channel or webpage whenever they do not feel sufficiently engaged with a game. As such, the improper selection of parameters may lead to a player becoming unengaged because they do not win or acquire any assets, they perceive a game level to be too complex, or the game rewards are not forthcoming.

Second, to properly engage users, the reward system of a video game must be fair and consistent. The improper selection of parameters can easily skew the reward system of a game by giving new users too many assets, at the expense of established users or vice-versa, by granting too many tokens, awards, objects, or abilities to one subset of users relative to another subset of users, or by assigning too much, or too little, value to a particular actions, challenge, objective or object. If the reward system of a game becomes corrupted in this fashion, players tend to feel the game is unfair, leading to disengagement.

Third, the selection of parameters should still preserve the randomness of value creation and activities within a game, thereby avoiding any express or implicit favoring of one subset of players relative to another, while still limiting the randomness to being within certain bounds, thereby avoiding excessively large, or small, rewards.

Thus, there is a need for methods and systems that can assist video game developers in designing video games that maximize user engagement and retention by proactively modeling the effect of certain gaming parameters within a game. There is also a need for methods and systems that can assist video game developers in predicting how a plurality of gaming parameters will affect the reward system of a game, user engagement and user retention. It is also desired that such a system is easily accessible to the developers and provides a user friendly interface.

SUMMARY

The present specification is directed toward a computer-implemented method for simulating a game environment to determine one or more appropriate boundary conditions for awarding virtual game items to a plurality of players, said method being implemented in a computer having a processor and a random access memory, wherein said processor is in data communication with a display and with a storage unit, the method comprising: forming a pool of virtual game items, wherein each of said virtual game items belongs to a category; establishing a lower boundary condition and an upper boundary condition for each category of said virtual game items; for each of said plurality of players and during a game session, randomly selecting a value between said lower boundary condition and upper boundary condition for a given category of said virtual game items and associating said value to said category of said virtual game items; for each of said plurality of players and during the game session, modifying each value associated with each category of said virtual game items to yield, for each category, a modified value; for each of said plurality of players and during the game session, determining, for each category, if the modified value meets the lower boundary condition or the upper boundary condition; for each of said plurality of players and during the game session, if the modified value meets the lower boundary condition or the upper boundary condition for one category, awarding a virtual game item from said one category; and for each of said plurality of players and during the game session, if, for any of the categories, none of the modified values meet the lower boundary condition or upper boundary condition, allocating an alternative award.

The game session may be a simulated game session, said simulated game session using historical player data to determine actions of each of said plurality of players. Optionally, the computer-implemented method further comprises generating a graphical user interface output of said simulated game session, said graphical user interface output comprising at least one of 1) a plot representing an average number of categories of items purchased or awarded as a function of a game number, 2) a histogram showing a distribution of when an average of said plurality of players obtained a first game item in the simulated game session, 3) data representative of an accumulation of virtual game currency, 4) data representative of an acquisition of a number of each type of game item, 5) data representative of a degree of rarity or commonness of game items obtained, 6) data representative of a number of reward packs obtained by said plurality of players as a function of a number of simulated game sessions played, and 7) data representative of a rarity or commonness of a number of reward packs obtained by said plurality of players as a function of a number of simulated game sessions played. Optionally, the computer-implemented method further establishes modifying at least one of the lower boundary condition and the upper boundary condition for at least one category of said virtual game items based upon said graphical user interface output of said simulated game session.

The pool of virtual game items may be formed based upon at least one of three value types. Optionally, a first of said three value types is a value received by a player based upon a function of how long said player played a game or a function of whether said player won or lost the game. Optionally, a second of said three value types is a value received by a player for completing a mission, a challenge, or other discrete objective or goal in a game. Optionally, a third of said three value types is a value randomly received by a player or a value purchased by a player.

Optionally, the computer-implemented method further comprises, for each of said plurality of players, if, for more than one category, more than one of the values meets or exceeds the lower boundary condition or the upper boundary condition, awarding a virtual game item from a category associated with one value of said more than one of the values that most exceeds its lower boundary or upper boundary condition.

Optionally, the computer-implemented method further comprises, for each of said plurality of players and during the game session, after awarding a virtual game item from said one category, randomly selecting a new value between said lower boundary condition and upper boundary condition for said one category of said virtual game items and associating said new value to said one category of said virtual game items.

Optionally, modifying each value is performed by decrementing said value by a predefined amount and determining, for each category, if the modified value meets the lower boundary condition or the upper boundary condition is performed by determining if the decremented value meets or exceeds the lower boundary condition.

Optionally, modifying each value is performed by incrementing said value by a predefined amount and determining, for each category, if the modified value meets the lower boundary condition or the upper boundary condition is performed by determining if the incremented value meets or exceeds the upper boundary condition.

The alternative award may be virtual currency.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings.

DETAILED DESCRIPTION

Figure 1:
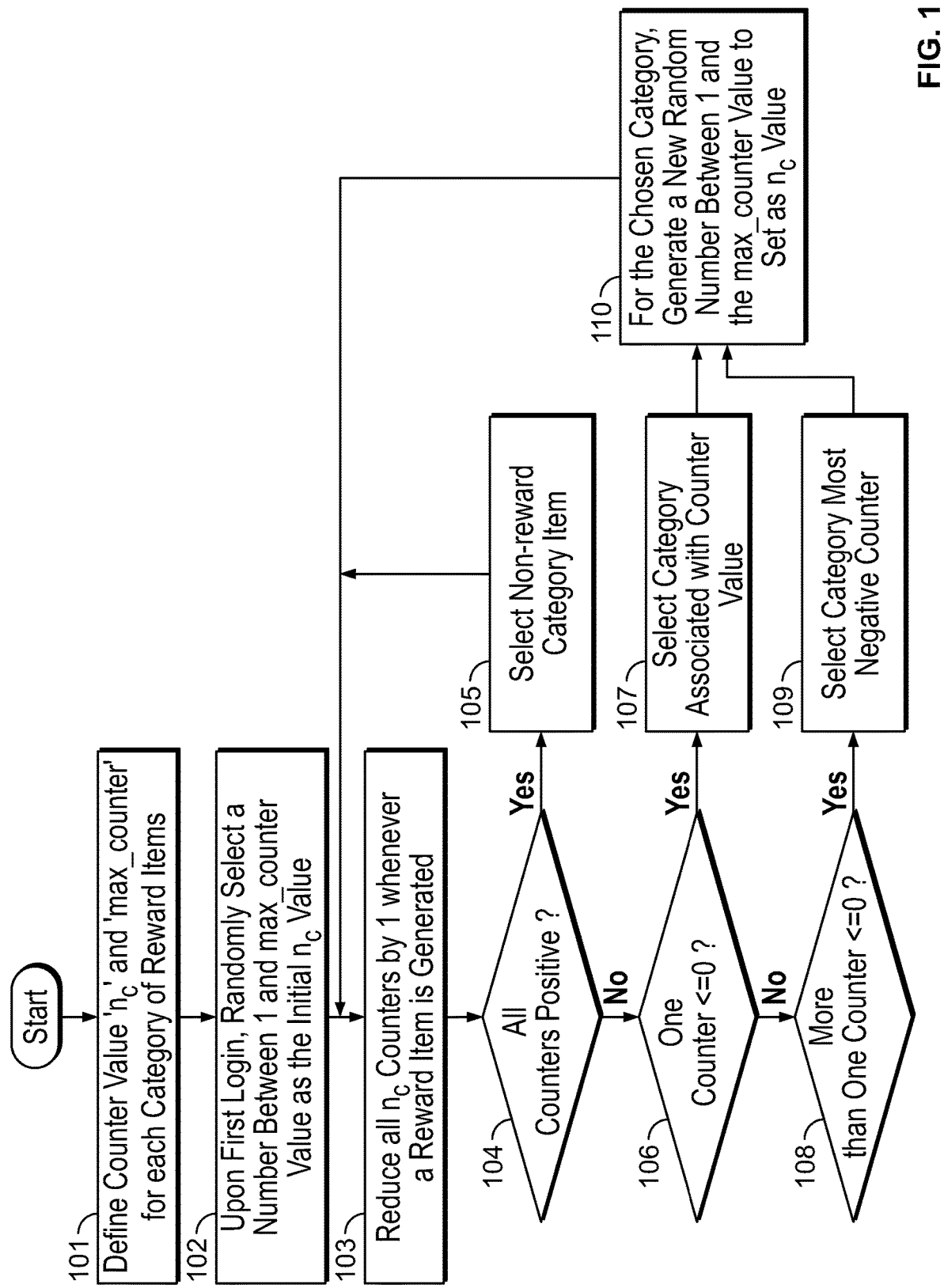
FIG. 1 is a flowchart illustrating an exemplary method of generating reward items in a game, according to one embodiment of the present specification.

The present specification describes a system comprising a software tool that facilitates the design of reward based games. In one embodiment, the tool assists the game developers in designing a true randomized, non-biased and neutral gaming environment that is bounded so that extremes of disincentives and excess incentives are avoided.

In one embodiment, the software tool allows for simulating a game environment and generates variables that enable reward acquisition by players. In another embodiment, the software tool allows for simulation of other aspects of the game, such as those governing game progression or virtual game currency. In one embodiment, the software tool allows the game systems to be defined in such a way that an agent, such as an artificial player implemented by a computer program, can interact with the game environment. In one embodiment, the software tool uses generative models driven by data from previous versions of a game to define the behavior of such agents in simulated games.

In one embodiment, the present system allows the recording of metrics for each agent in the simulation tool, and an aggregate of metrics generated by all the agents is presented to the user (game developer). These metrics may be analyzed to design the game such that player engagement is maximized. In one embodiment, the software tool may be accessed via a web based user interface, so that input parameters and results may be efficiently shared by all members of a design team.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

In all embodiments herein, it should be appreciated that the software tool comprises a plurality of programmatic instructions that is stored in a non-transient memory and is preferably, but not necessarily, executed on a computer with a processor having a minimum CPU clock speed of 2.7 GHz and a preferred minimum amount of local RAM is 16 GB. It is further preferred that the computer is in data communication with at least one database that adapted to store the game parameters. Alternately, the game parameters may be stored on the computer memory itself. Additionally, a display is in data communication with the processor and preferably that display has a minimum screen resolution of 1920×1080p. Operationally, the software tool interacts with a server that is responsible for hosting, running, or executing the game being simulating using a backend communication software such as demonware via xmlrpc. During the simulations described herein, the software tool requests and obtains the requisite data from the server and uses that data to generate the interfaces, predictions, and other outputs described herein.

It may be noted that the simulation tool of the present specification may be run on a user's personal computing device, such as a laptop or a tablet PC. For the purpose of collaboration with other game developers, the system of present specification includes a web-based user interface, which in one embodiment, runs on a separate server that multiple users can access via a web browser.

In one embodiment, the game simulation and design tool of the present specification supports games that, in the course of game play, include variables such as total points, coins or tokens, player experience level (XP), a game level, a rate or extent of increasing from one game level to a higher game level, health status of a game character, strength of a game character, abilities of a game character, objects owned by a game character, and/or weapons owned by a game character. For such games, the present software tool simulates and analyzes how a particular set of parameters impact various aspects of a game, including but not limited to 1) the accumulation of one or multiple types of virtual game currency, such as currency acquisition per unit of game play time and bonuses for wins or other game achievements, 2) the acquisition of certain items or game currency through the exchange of other game items, including the destruction of duplicate items, 3) the acquisition of rewards, such as by accumulating various types of game items, completing game objectives or goals, or acquiring items through the direct spending of game currency.

In one embodiment, the software tool of the present specification allows for the simulating and design of a supply drop feature in a game, which grant game items or game currency in a randomized way. As known in the art, a supply drop in a game is a mechanism of granting a player a plurality of different types and numbers of items for use in a game. The types, numbers and values of the game items are preferably randomly provided, but within certain bounds, thereby insuring fair (random) game play but not risking the excessively high or low rewarding of users.

To mirror this objective, the present software tool provides multiple options for the method by which the items will be randomly drawn during game play. According to one aspect of the present system for example, items may be drawn from multiple groups, with each group having a fixed probability of being selected. According to another aspect, it may be possible to select the item group via a counter value method, wherein the maximum number of draws allowed is set before a given group of items is chosen. The probability of getting an item from the group in a smaller number of draws than the maximum is set to be independent of the draw number. For the counter value method, the system uses a formula to initialize the draw numbers for new players, in order to prevent them from having unusually poor item acquisition and becoming disengaged with the game. After a group of items is chosen, the process may be repeated as desired, with the items being further divided into subgroups. Otherwise, one of the specific items in the group is selected to be drawn by the player, with each item having an equal chance of being selected.

In one embodiment, the present game design and simulation tool allows the game systems to be defined in such a way that an agent, such as an artificial player implemented by a computer program, can interact with the game environment. The present software tool uses generative models driven by data from previous versions of a game to define the behavior of such agents in simulated games. In one embodiment, the parameters related to agent behavior may be derived from user behavior data in prior game titles.

As such, the software tool allows simulated players or agents to interact with the game's systems according to a number of parameters derived from prior user data, including but not limited to:

Probability of playing in different types of matches;
Probability of winning or losing in each game;
Logic for determining how the agent spends its virtual game currency;
Logic for determining how and when the agent trades its game items for game currency;
Games the agent plays per simulated day;
Rate for the agent to make simulated purchases with game currency or real money; and
Probabilities and rates for players to achieve game objectives.

In one embodiment, the present tool provides the capability to set an agent to exactly mimic the actions of a specific real player from a previous game, and replicate the feature for a large number of agents and players simultaneously. For example, if an actual player in Game X traded game items after playing 10 games, 20 games, and 27 games, the software tool generates a virtual player or agent to be set up to follow this behavior for a simulation of Game Y.

While game data and parameters may be artificially generated for the purpose of simulation, in another embodiment, actual game data and parameters are obtained directly from the game's backend, rather than by generating them in the simulation. For example, the software tool requests and obtains data for variables such as the numbers and types of supply drops, the amount of play time spent by different players, amount of money spent by different players, among other variables, from the game server and uses that player data to simulate a new game. One of ordinary skill in the art would appreciate that such data is part of the standard set of data that is stored on separate servers for any game.

In one embodiment, after each simulated game played by an agent, key metrics of interest about the agent are recorded by the present game design system. Examples of such metrics include, but are not limited to, 1) the number of different item types obtained, 2) the number of items or rewards purchased, 3) the number of each type of item granted on average, 4) the quantities of game currencies held, 5) the quantity of player experience (XP) earned, 6) the items obtained from the rarest tier of game items, 7) the number of duplicate items obtained, 8) the amount of player health earned or expended, 9) the amount of player strength earned or expended, or 10) any player characteristics that may increase or decrease in the course of game play. It may be appreciated that as many metrics as are relevant may be generated after a game simulation.

After the games for all agents have been simulated, the above metrics are aggregated over all agents, and presented to the user (game developer) in a graphical manner. The statistics may include, for example, a plot representing the average number of specific categories of items purchased or awarded as a function of the game number or a histogram showing the distribution of when the virtual players obtained their first weapons in a combat game. These statistics may be used by the game developers, for example, to ensure that the game does not produce rewards in a manner that discourages users, over-rewards users, or makes a player strongest by simply purchasing all assets and/or rewards.

Some other examples of statistics that may be generated by the game simulation in graphical form include, but are not limited to:

Amount of a given type of game currency earned, by source, as a function of number of games played;

Fraction of the total number of reward items which may be acquired, for each kind of reward item, as a function of number of games played;

Fraction of the total number of reward items which have been acquired, for each kind of reward item, as a function of number of games played;

Fraction of the items obtained which are duplicate, for each kind of item, as a function of number of games played; etc.

In one embodiment, the game design and simulation system of the present specification includes an online user interface to facilitate the use of the simulation tool by a game development team. This interface allows a game developer to access various features and perform a variety of analysis and design tasks with the tool, such as setting various simulation parameters, including game parameters as well as the parameters governing the properties of the agents, running a simulation for a specified number of games and virtual players or agents, viewing statistics resulting from the simulation in a desired format such as plots, graphs or tables, saving a set of parameters, so that they may be loaded again either by the same user, or by another user on the team, and downloading a set of parameters in a desired format such as a spreadsheet.

The functional utility of the game design and simulation tool of the present specification will be better understood by its application to an exemplary game, as explained in the following sections. For the purpose of the present example, a massively multiplayer online role-playing game, in which a very large number of players interact with each other, via virtual characters, within a virtual world, is considered but it should be appreciated that the software tool is applicable to any other type of game which rewards users with random benefits.

In one embodiment, the game in the present example uses three value types to determine the scope, extent, mix, type and/or number of game items. The first value type is defined as the value received by a player based upon a function of whether or how long the player played a game and/or a function of whether the player won the game or lost the game. For example, a player may receive $a*b*t$ currency at end of match, where t is how long the player was in the match, a is a set universal multiplier, and b is 1 if the match was lost, and a fixed win multiplier greater than 1 if the match was won. It should be appreciated that the programmatic instructions which define the operation of the game are defined such that, upon execution, the amount of time a user plays the game is tracked, via an internal clock, whether a user initiates game play is tracked and stored in memory, and the outcome of the game, including a score, a winner, and a loser is tracked and stored in memory.

As an example of use of simulation tool of the present specification, the first value type may correspond to virtual game currency. Simulated players receive game currency per minute of game play. The simulation tracks the game currency received for each player, and may have the players spend the currency on a purchase of various reward items. The simulation will then grant the players the reward items acquired. Further, this data about acquired reward items is also recorded by the simulation, and so on.

The second value type may be defined as value received for completing a mission, a challenge, or other discrete objective or goal in a game. In one embodiment, the second value type may be acquired from game items or rewards, by disposing of duplicate rewards or items, and/or by simply logging into the game. It should be appreciated that the programmatic instructions which define the operation of the game are defined such that, upon execution, a user's actions are tracked in the game, including saving into memory data representative of completing the missions, challenges, or other discrete objectives or goals.

The third value type may be defined as value that is randomly generated, within certain predefined limitations, in a game or may be defined as items or other value purchased with real world, government recognized currency.

In the course of any given game, a player may acquire several types of game items as rewards. Various types of game items that may be acquired include, but are not limited to virtual game currency, weapons, tools, cosmetic consumables, calling cards, player gear, emblem shapes, different types or levels of gameplays, and care packages. Reward items may also include team items for a mission team, in case of team games. For example, for the "Superhero" team, the team items might include Superhero weapons, Superhero gear, cosmetic consumables, among other virtual items.

Typically, an item in the reward pool is identified using data representative of an identifier, such as an ID number and/or a tag, which indicate the type of item and its availability in terms of how frequently the item may be found, i.e. whether it is commonly available, somewhat available, or rarely available. Thus, for example, if the tag or identifier for an item is (weapon, common, 8), it indicates that the reward item is a weapon, is commonly available and it's ID number is "8". The item ID is used to uniquely determine the item within the pool of elements with the same tag. In one embodiment, a counter system is used to generate the next element in the tag. In one embodiment, once the set of tags have been determined, an ID number is chosen at random from among the set of available items with those tags, with the probability of all items to be chosen being equal.

Operationally, during game play, the programmatic instructions defining the execution of the game generates, for each player, reward packs comprising one or more game items, as described above. The items are randomly picked up by the game logic from the available pool of items. In one embodiment, reward packs may be categorized into various types, and may be acquired by players in several ways. Thus, for example, some reward packs in the exemplary multiplayer game may be purchased by the players in exchange for an amount of the first value type. Still another category of reward packs may be purchased by players in exchange for an amount of the second or third value type. Yet another category of reward packs may be granted to a player upon first login to the game. The reward packs may further be categorized depending on the availability, such as commonly available reward packs or rare or premium packs.

In one embodiment, all categories of reward packs are generated by a common game program. Certain categories of reward packs may have separate generation systems, to ensure the inclusion of items relevant to that category. For example, rare reward packs may be generated by separate counter systems, such that these packs include more rare items.

Specific game items, such as tools for game play may be acquired by players in exchange for an amount of the first, second or third value type, where the amount required is a function of the number and type of game items already acquired. In this context, a fourth value type may be defined as the number of units of the first or second or third value type, received by a player for dismantling or disposing of a duplicate item. Then the amount required to acquire a new item is a function of the fourth value type. In one embodiment, the amount required is a constant factor cf times the fourth value type. Thus for example in a war based game, if cf=15, a player will have to dispose of 15 items of a given category and/or availability in order to acquire another item of the same category and/or availability.

FIG. 1 is a flowchart illustrating an exemplary method of generating reward items in a game. The exemplary method uses a counter based system to generate various categories of reward items with equal probability. Referring to FIG. 1, firstly, each category of reward items in the game is associated with a counter value '$n_c$'. A maximum, or boundary condition, for the counter value ('max_counter' value) is also defined. This is shown in 101. Next, when a player logs into the game for the first time, for each category, a number between 1 and max_counter value is randomly chosen as the initial $n_c$ value, with a defined probability. This is shown in 102. It may be noted that even though the counter value is randomly chosen, a probability for each value being chosen is defined in order to equally generate all categories of reward items.

Next in 103, whenever a reward item is generated, all of the $n_c$ counters are reduced by 1. If all of the counter values are positive at this point, a non-reward category of item may be chosen, such as game currency. This is shown in 104 and 105. If one of the $n_c$ values is less than or equal to 0, then the category associated with that $n_c$ value may be chosen instead, as shown in 106 and 107. If more than one $n_c$ value is less than or equal to 0, then the category with the most negative counter value may be chosen, as shown in 108 and 109.

In case several categories have the same $n_c$ value, which less than or equal to 0, the reward category may be chosen by a predefined priority.

Next, in 100, a new random number is generated between 1 and the max_counter value associated with the chosen category. The associated $n_c$ counter value is then set to the generated number to reset it.

Accordingly, the present specification discloses a computer-implemented method for simulating a game environment to determine one or more appropriate boundary conditions (the max counter value) for awarding virtual game items to a plurality of players. The method includes: 1) forming a pool of virtual game items, wherein each game item belongs to a category, 2) establishing a lower boundary condition, e.g. 0 or 1, and an upper boundary condition, e.g. the max counter value, for each category of the virtual game items, 3) for each of the plurality of players and during a game session, randomly selecting a value, e.g. a counter value, between the lower boundary condition, e.g. 0 or 1, and the upper boundary condition, e.g. the max counter value, for a given category and associating the value to the category of the virtual game items, 4) for each of the plurality of players and during the game session, modifying each value, e.g. by decrementing the counter value, associated with each category of the virtual game items to yield, for each category, a modified value, e.g. a counter value minus one, 5) for each of the plurality of players and during the game session, determining, for each category, if the modified value, e.g. decremented counter, meets the lower boundary condition, e.g. 0 or 1, or the upper boundary condition, max counter (noting that the system can be readily designed to count up or count down), 6) for each of the plurality of players and during the game session, if the modified value meets the lower boundary condition or the upper boundary condition for one category, awarding a virtual game item from said one category, and 7) for each of the plurality of players and during the game session, if, for any of the categories, none of the modified values meet the lower boundary condition or upper boundary condition (none of the counter values hit 1 or max counter), allocating an alternative award, such as virtual currency or another token of some kind.

Figure 2:
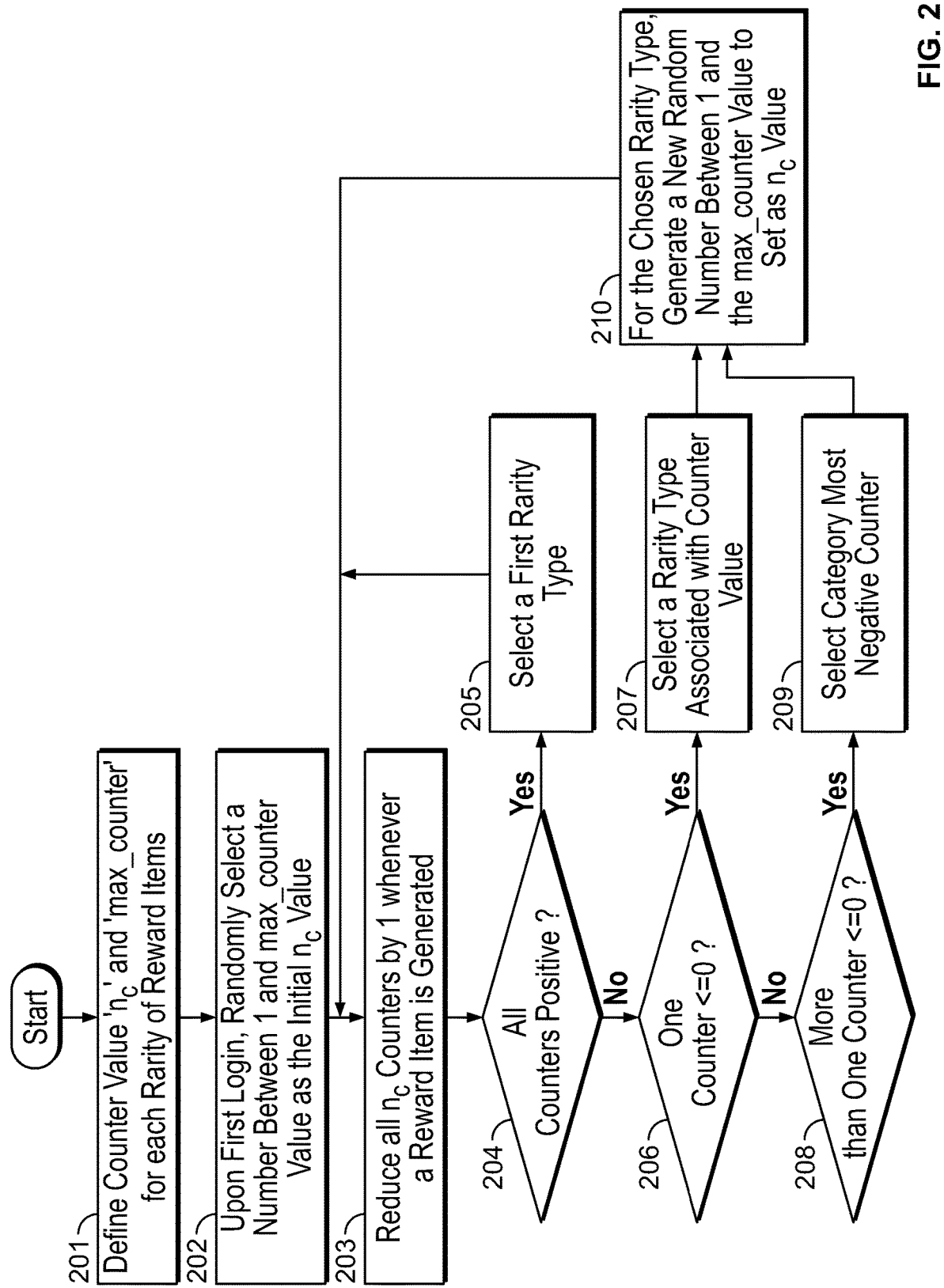
FIG. 2 is another flowchart illustrating an exemplary method of generating reward items in a game.

FIG. 2 is another flowchart illustrating an exemplary method of generating the rarity of a reward item in a game. As in FIG. 1, the exemplary method uses a counter based system to generate rarity or availability of various rarities of reward items, in accordance with the rules and structure of a game. Referring to FIG. 2, firstly, each rarity of reward items in the game is associated with a counter value '$n_c$'. A maximum, or boundary condition, for the counter value ('max_counter' value) is also defined. This is shown in 201. Next, when a player logs into the game for the first time, for each rarity, a number between 1 and max_counter value is randomly chosen as the initial $n_c$ value, with a defined probability. This is shown in 202. It may be noted that even though the counter value is randomly chosen, a probability for each value being chosen is defined in order to equally generate all rarities of reward items.

Next in 203, whenever a reward item is generated, all of the $n_c$ counters are reduced by 1. If all of the counter values are positive at this point, a first predefined rarity of item may be chosen. This is shown in 204 and 205. If one of the $n_c$ values is less than or equal to 0, then the rarity (a second rarity) associated with that $n_c$ value may be chosen instead, as shown in 206 and 207. If more than one $n_c$ value is less than or equal to 0, then the rarity with the most negative counter value may be chosen, as shown in 208 and 209. In case several rarities have the same $n_c$ value, which less than or equal to 0, the preferred rarity may be chosen by a predefined priority. Next, in 200, a new random number is generated between 1 and the max_counter value associated with the chosen rarity. The associated $n_c$ counter value is then set to the generated number to reset it.

Thus, after the category of reward items is chosen as in FIG. 1, a similar counter based process is used to choose the rarity or availability. Each rarity is associated with a different counter, just as the different categories are associated different counters in FIG. 1. It may be noted that the rarity counter values exist separately for every category. After choosing a category of reward items as per the process of FIG. 1, the system uses the rarity counters that are associated with the chosen category, to select a rarity value for a given category of reward items. For reward packs designated 'rare' in a game, it is imperative that the system generates at least one item of rare category in the pack. This may be implemented by associating separate sets of counters with 'rare' and 'common' category reward packs. Thus, for example in a 'rare' reward pack, two items may be selected according to a set of counters which includes all rarities, and a third item may be selected from a separate set of counters which does not include common items, and is therefore rare. This method may be customized to generate any number of items in a 'rare' or 'common' reward pack, depending upon the requirements of the game.

One of ordinary skill in the art would appreciate that any number of parallel counter systems may be added to the system logic, to generate a corresponding number of categories or classes of reward items.

Figure 3A:
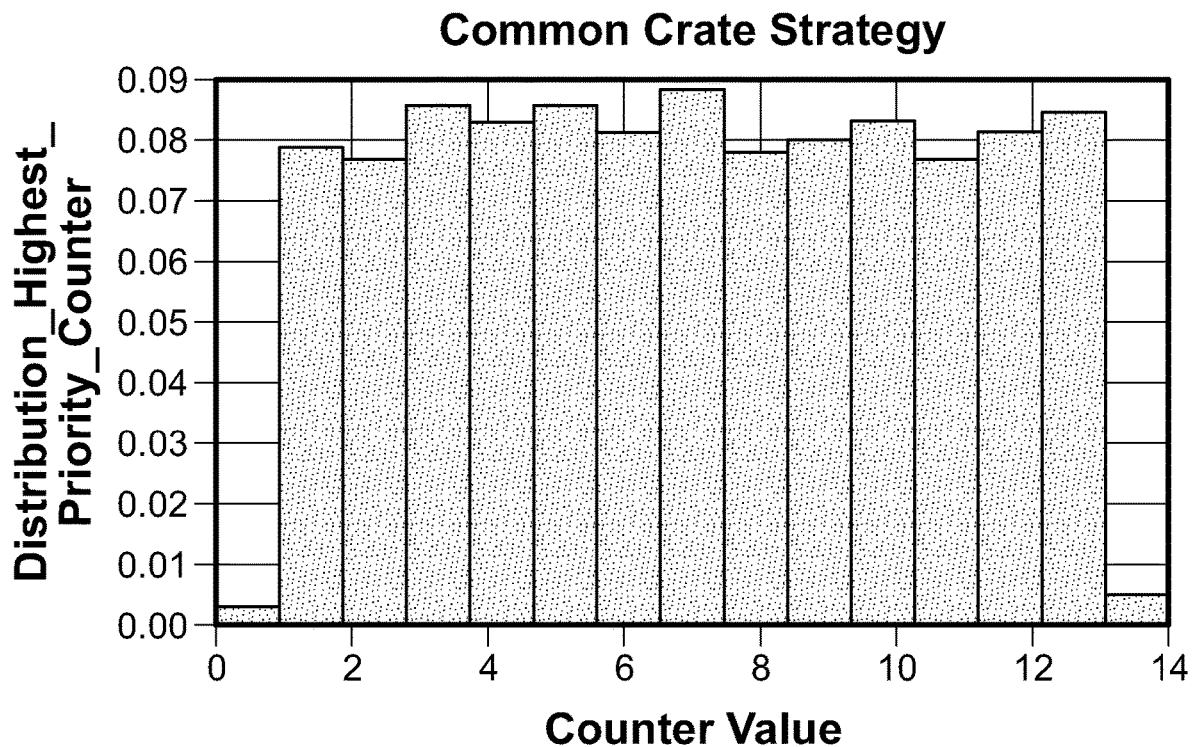
FIG. 3a illustrates exemplary reward generation as function of counter values at the beginning of a game.
Figure 3B:
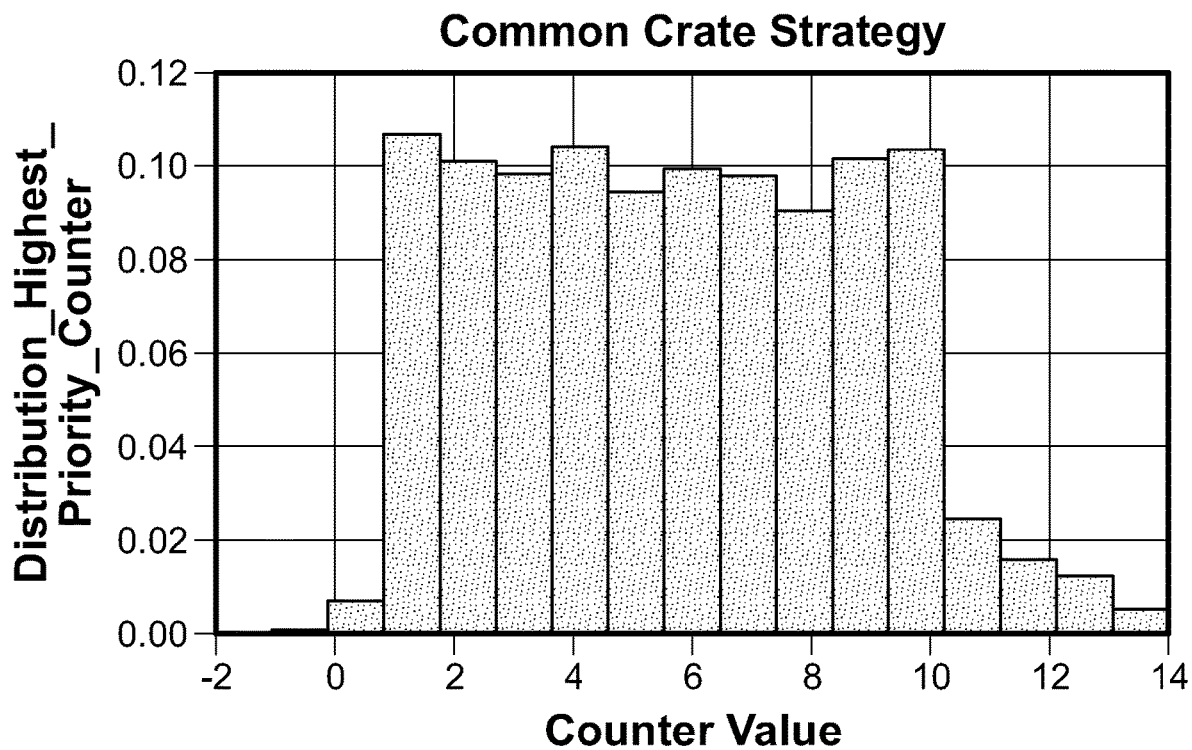
FIG. 3b illustrates exemplary reward generation as function of counter values, as the game progresses.
Figure 3C:
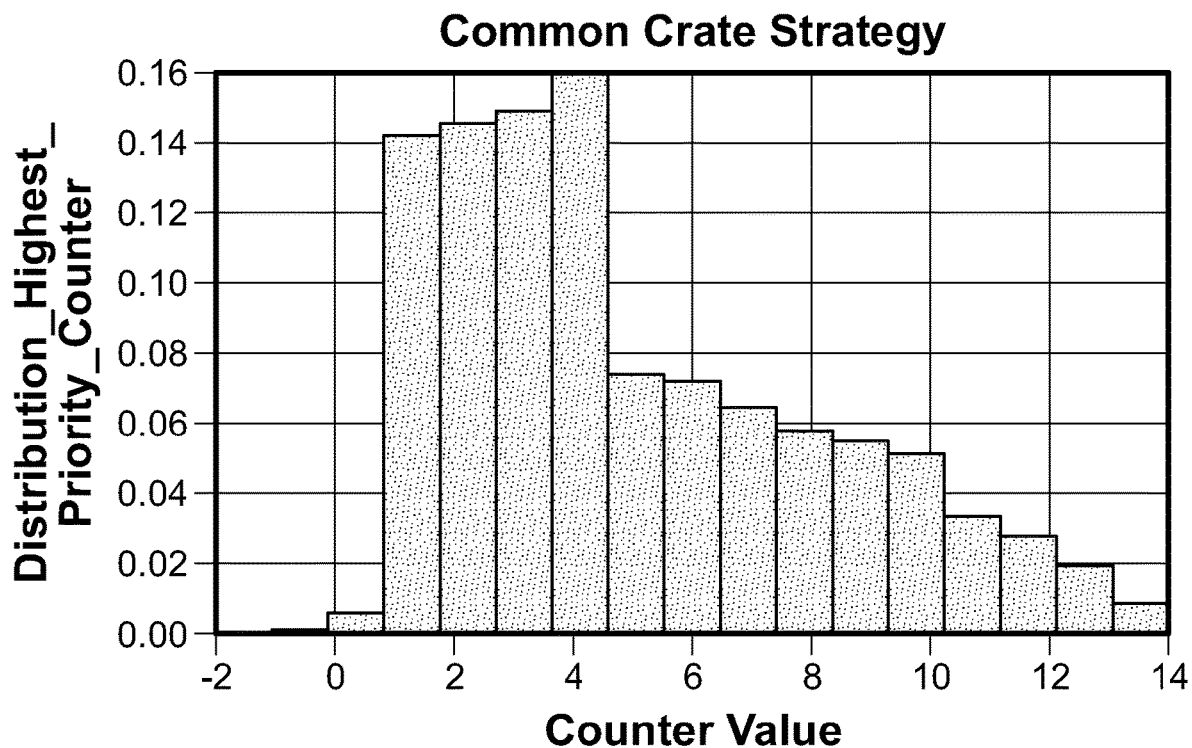
FIG. 3c illustrates exemplary reward generation as function of counter values, as the game progresses.
Figure 3D:
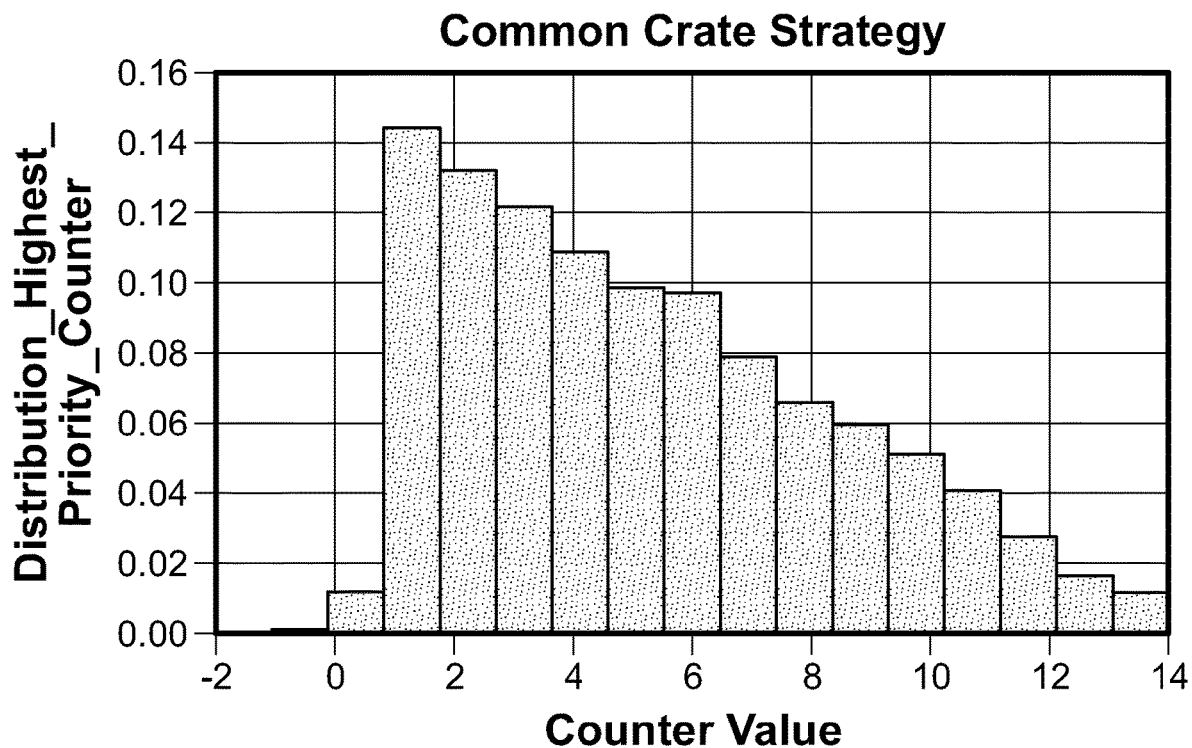
FIG. 3d illustrates exemplary reward generation as function of counter values, as the game progresses.

It may be noted that the system needs to be initialized with counter values such that no category of reward items has a greater probability of being generated for acquisition by players. For example, if all counter values are uniformly initialized from the interval (1, max_counter value), players are farther away from receiving non-default category reward items than they would be at typical other times during their playing career. This is illustrated by means of histograms in FIGS. 3a, 3b, 3c and 3d, which represent counter values for the highest priority category of items when initializing uniformly. Referring to FIG. 3a, the distribution of highest priority counter as a function of counter values is shown, after the first reward generation. FIG. 3b illustrates the same distribution after 4 generations, FIG. 3c illustrates distribution after 10 generations and FIG. 3d illustrates the distribution after 30 generations. As can be seen from the figures, the system progressively reaches an equilibrium state after several instances of reward generations, in which the distribution of the highest priority counters decreases and the counters have a higher probability of being small than at initialization. Because of this, any default-category reward will be generated more often than right after initializing. The present method solves this problem by using a different approach to initializing the counter values, which is illustrated in FIG. 4, which again shows a distribution of highest priority counter as a function of counter values.

Figure 4:
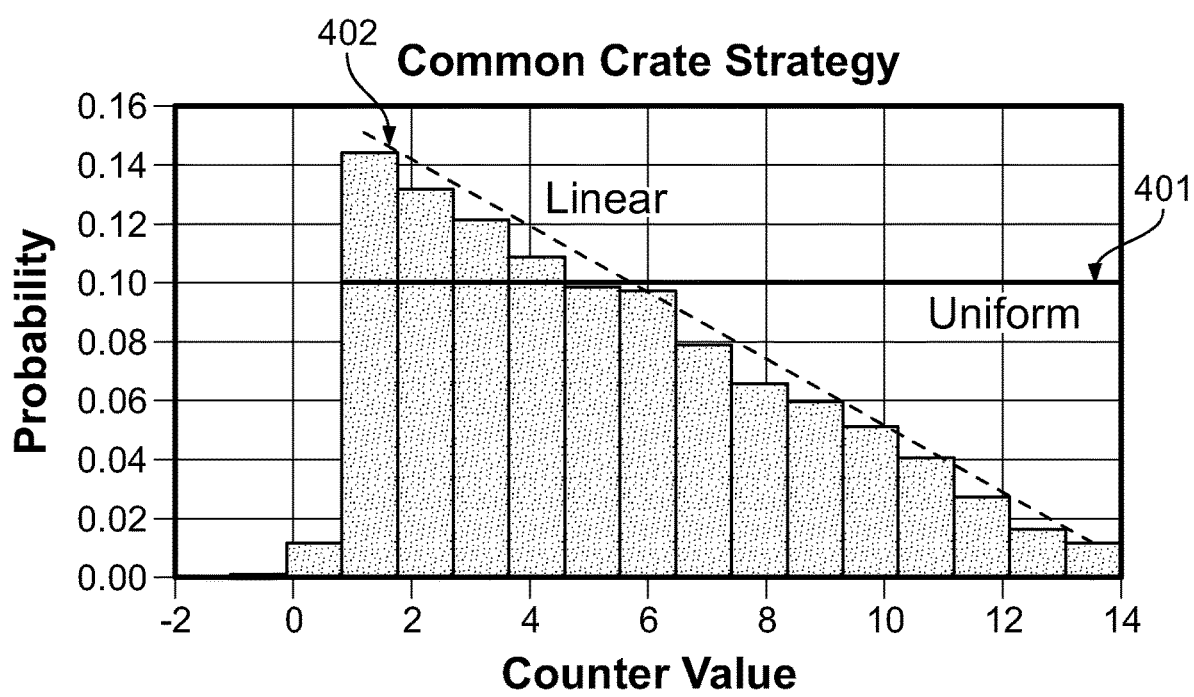
FIG. 4 shows a distribution of a category of rewards as a function of counter values.

Referring to FIG. 4, instead of initializing from the uniform distribution, as illustrated by line 401, the system logic initializes counter values from a linear approximation of the equilibrium distribution, illustrated by line 402. In this manner, it is ensured that all categories of reward items are generated with equal probability at all times. More specifically, when a user first logs in, if the system initializes n to a random number between 1 and M, a user would have a likelihood of receiving a reward item of a category and/or rarity level equivalent to scenarios where a user had just received a reward item of a predefined category or rarity level, thereby beginning the player's experience in the worst possible statistical situation. By initializing from a linear approximation of the equilibrium distribution, instead of from a uniform distribution, the system chooses the random initial value of n such that there is a higher probability of starting n off at a smaller size. In this case, after a player has been playing for a while, the probability of n having different values follows approximately the linear distribution, illustrated as 402 in FIG. 4. Thus, it is better to initialize with the linear distribution, so that the initial player experience is not worse than a typical experience.

To make this point clearer, consider the case where only an item rarity is to be selected, regardless of the category. If we suppose there are just two rarities, common and rare, with common being the default, we let the max counter value for the "rare" rarity be M, and let the associated counter be n. Whenever n drops to 0, the system grants the player a rare item, after which n is reset to a random number between 1 and M. The counter n then progresses back down towards 0. Therefore, on average, a player is farthest from obtaining a rare item just after they received one (and the counter resets). At other more general times, the player will be closer to getting their next rare item. By using the aforementioned approach, the system can avoid having the user begin at the worst possible position but rather, at a more common position.

The design and simulation tool of the present invention creates a game environment based on the above game rules and logic flows, and makes use of virtual players or agents to interact with the game environment. The simulation tool records game play data for all the agents and generates aggregate metrics for decision making. This helps a game developer to determine if game is running in accordance with the set rules and logic flows. The agent behavior and data also help a game developer to determine the level of user engagement with a game and they can use this judgment to improve the game experience for the players and optimize user engagement and retention.

Thus, for example, the counter value system for the exemplary game as described above allows for setting a maximum number of draws until a weapon (or any other item) is dropped. The game developer might decide, for instance, that a weapon drop, which is randomly generated subject to a boundary of occurring in at most 4 draws, would be ideal for a good user experience. In that case, there could be a 25% chance of a weapon dropping immediately after the previous weapon, a 25% chance of a weapon dropping two drops later, 25% chance of 3 drops later and 25% chance of 4 drops later. Using the simulation tool of the present specification, the game developer is able to test their judgment and see if the predefined boundary condition, e.g. 4, is a good number for the maximum number of draws between weapons, from the point of a good user experience. This can be done by setting the appropriate parameter to the boundary condition, e.g. 4, in the tool, and running a simulation with virtual players. After a simulated game session, the output aggregate metrics of the virtual players help the game developer to decide if their choice of "4" as the maximum number of draws had been too low, too high or optimum. If the decided option was not optimum, the game developer can change the option and test again. Thus, the simulation tool of the present specification allows a game to be iteratively optimized.

The following is a list of exemplary aggregate variables that may be subject to random generated, bounded by certain limitations, and other output variables generated by the tool, for the exemplary game described above. One of ordinary skill in the art would appreciate that the list is not exhaustive and there are many such variables. Further, the kind of variables generated may be customized according to the game being simulated. Exemplary variables for the above described game include:

The average number of common or rare or premium items obtained, preferably but not necessarily, as a function of games played.

The average amount of the first value type obtained from each acquisition channel, preferably but not necessarily, as a function of games played.

The average number of items of each rarity which could be acquired, preferably but not necessarily, as a function of games played.

The average number of reward packs of each type purchased, preferably but not necessarily, as a function of games played.

The fraction of items of each type acquired by the player, preferably but not necessarily, as a function of games played.

The average number of duplicate items received, preferably but not necessarily as a function of games played.

Figure 5:
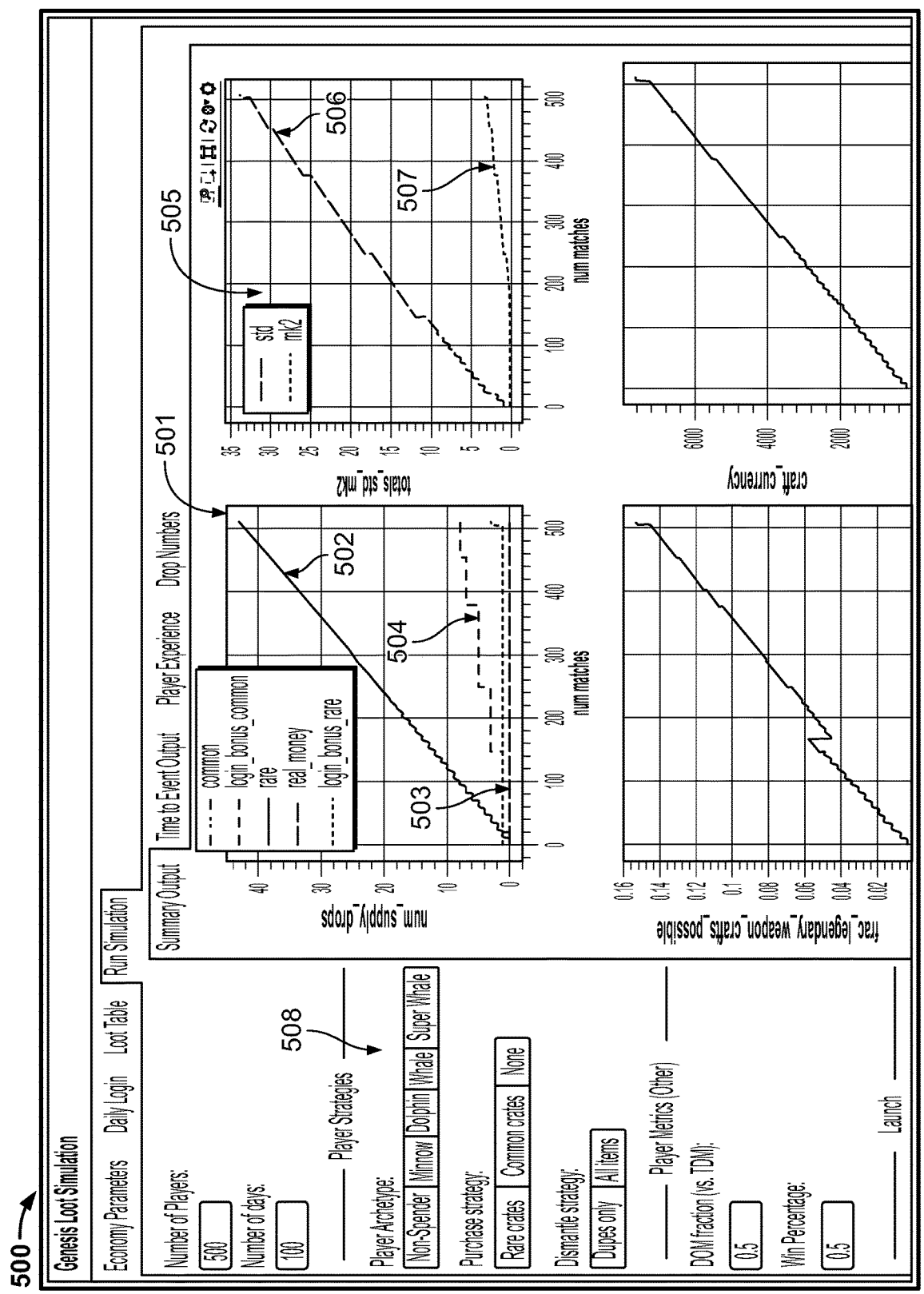
FIG. 5 illustrates an exemplary GUI screen presenting a number of metrics after a game simulation.

FIG. 5 illustrates an exemplary GUI screen presented to the game developer, when the simulation tool of the present specification is used for simulation and analysis of the exemplary game described above. Referring to FIG. 5, the GUI screen 500 presents several metrics in a graphical manner. For example, graph 501 illustrates various types of reward packs obtained by players on average as a function of the number of matches played, including rare 502, common 503 and login bonus 504 reward packs. Similarly, graph 505 shows the number of standard type of items obtained 506, as well as the number of premium items obtained 507, both as a function of the number of matches played. One of ordinary skill in the art would appreciate that any number and type of metrics may be recorded by the tool during game simulation and may be displayed in a graphical manner to the user. Another GUI output may include a histogram showing the game number when players obtained their first item of each category.

Screen 500 also provides information on player strategies or behavior 508, such as the amount of virtual currency or real money spent by players to purchase game reward items, the number of games played per day, whether a player purchases "common" or "rare" type of rewards, whether a player disposes of only duplicate items, or all items to gain other items or accumulate a value type, etc. In one embodiment, the simulation tool allows game developers to classify the simulated players into various groups, depending upon their playing strategy or behavior. One of ordinary skill in the art would appreciate that observations on player strategies and/or behavior provide valuable insights on what keeps the players engaged with the game.

Figure 6:
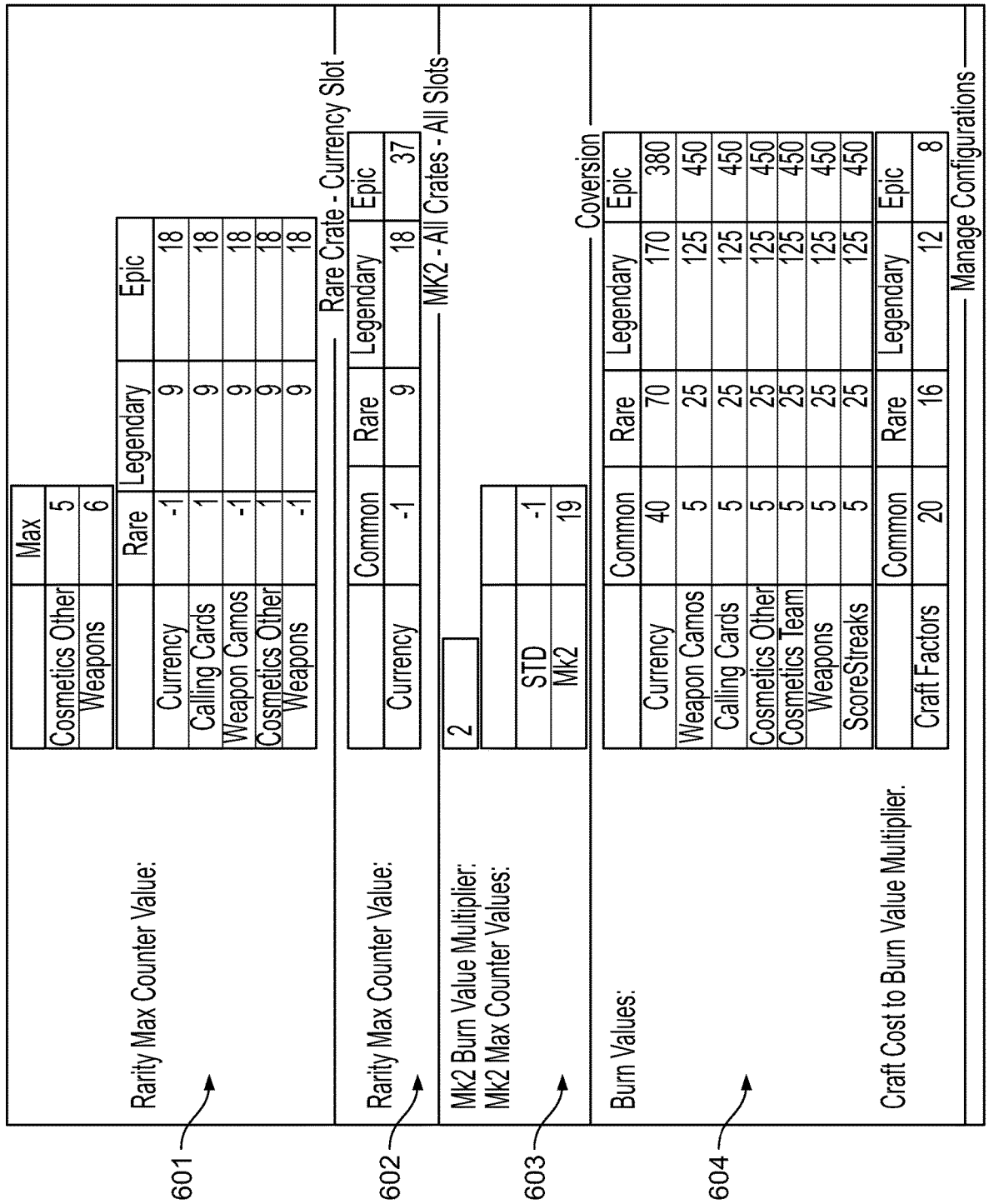
FIG. 6 depicts some exemplary parameters that may be defined before running a simulation using the simulation tool of the present specification.

FIG. 6 depicts some exemplary parameters that may be defined by a game developer before running a simulation using the simulation tool of the present specification. It may be appreciated that FIG. 6 illustrates only a small subset of the game parameters that may be defined for the purpose of simulation. Referring to FIG. 6, section 601 and 602 of the screen may be used to set counter values for rare and common items. The next two sections 603 and 604 may be used to determine the amount of a first, second or third value type obtained on disposing of items of a given category and/or rarity, and to determine the cost of acquiring an item of a given category and/or rarity.

Figure 7:
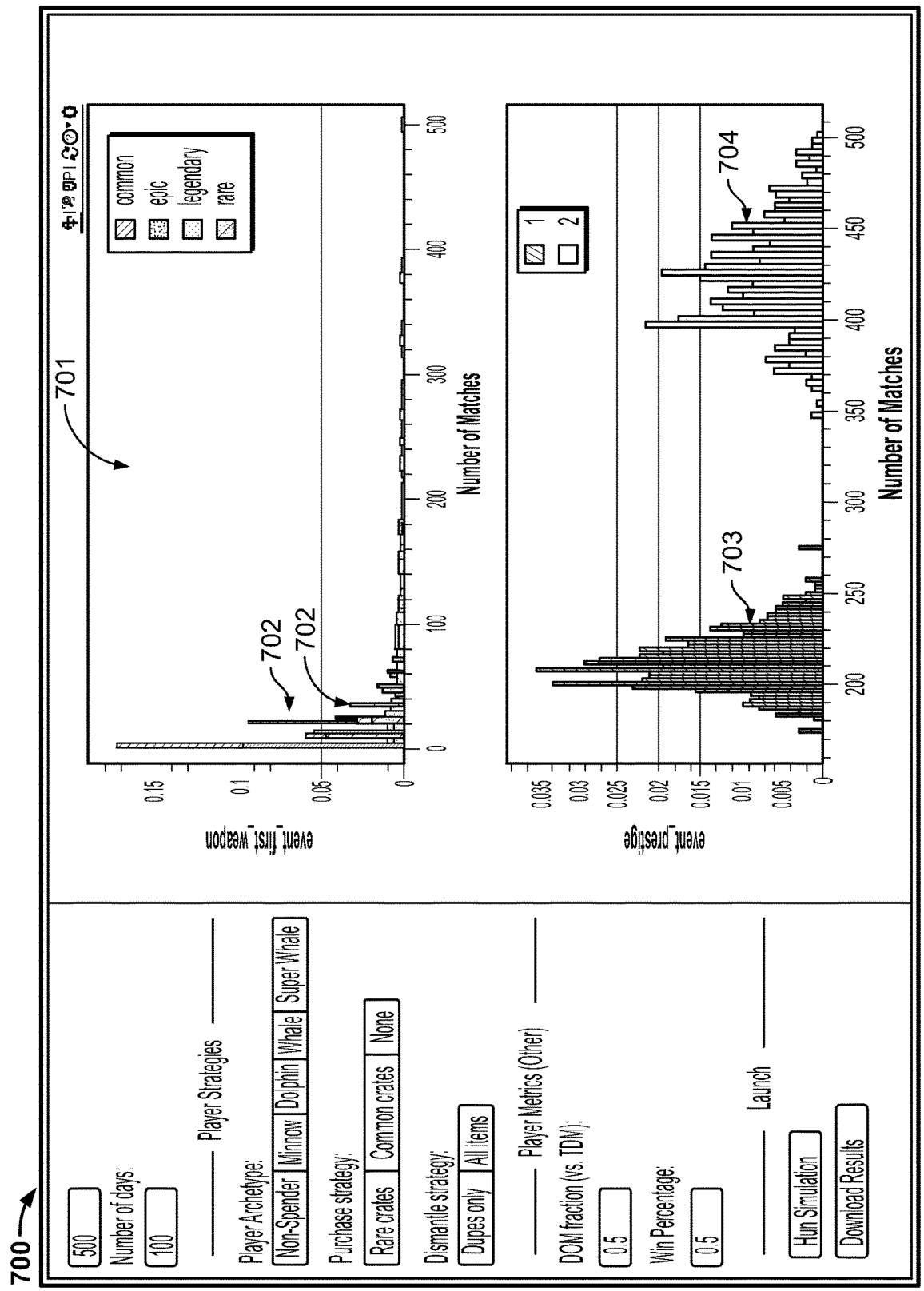
FIG. 7 illustrates another exemplary GUI screen that presents several metrics in a graphical manner.

FIG. 7 illustrates yet another exemplary GUI screen 700 that presents several metrics in a graphical manner. Referring to FIG. 7, a histogram 701 illustrates when players obtain their first reward, as a function of the number of matches played. Each bar 702 in the histogram shows the number of simulated players who obtained their first reward, such as a premium category weapon, at the given game number.

Graph 703 illustrates the number of matches played before a player achieves a certain level in the game. Similarly, graph 704 illustrates the number of matches played before a player achieves another specific level in the game.

Figure 8:
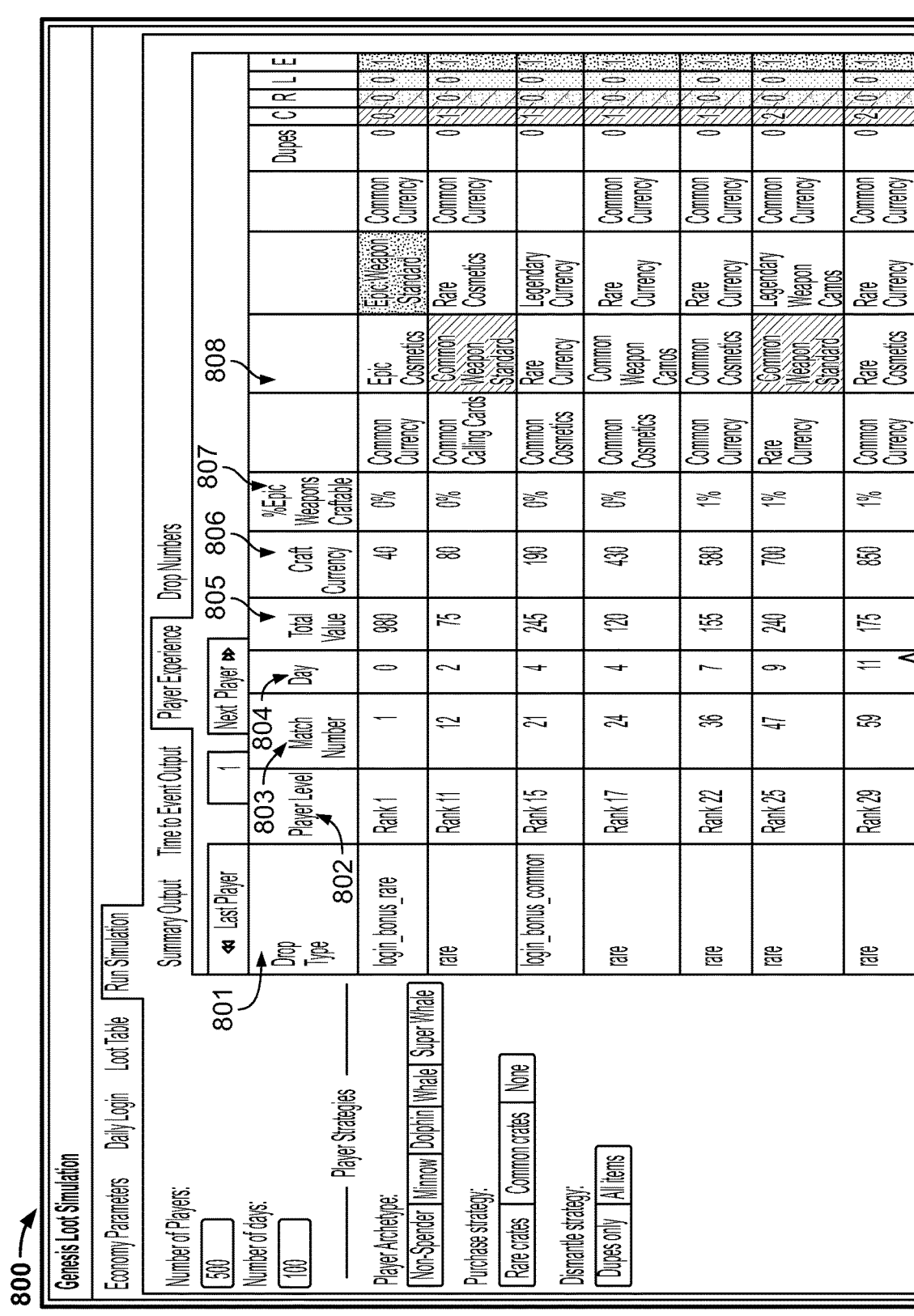
FIG. 8 is another GUI screen illustrating an exemplary output table, according to one embodiment of the present specification.

FIG. 8 is another GUI screen illustrating an exemplary output table comprising certain information for each player generated in the simulation exercise. Referring to FIG. 8, table 800 may be used to present information such as the type of rewards granted to a player 801, player level in the game 802, match number 803, day 804, total value of the rewards obtained in terms of game currency 805, the amount of a value type collected by the player 806, percentage of premium items a player could acquire if they spent all of their virtual game currency to do so 807, and specific categories of the items granted in a reward pack 808.

One of ordinary skill in the art would appreciate that any number and type of metrics recorded by the tool during game simulation may be displayed in a graphical and analytical manner to the user to assist game design and development.

Figure 9:
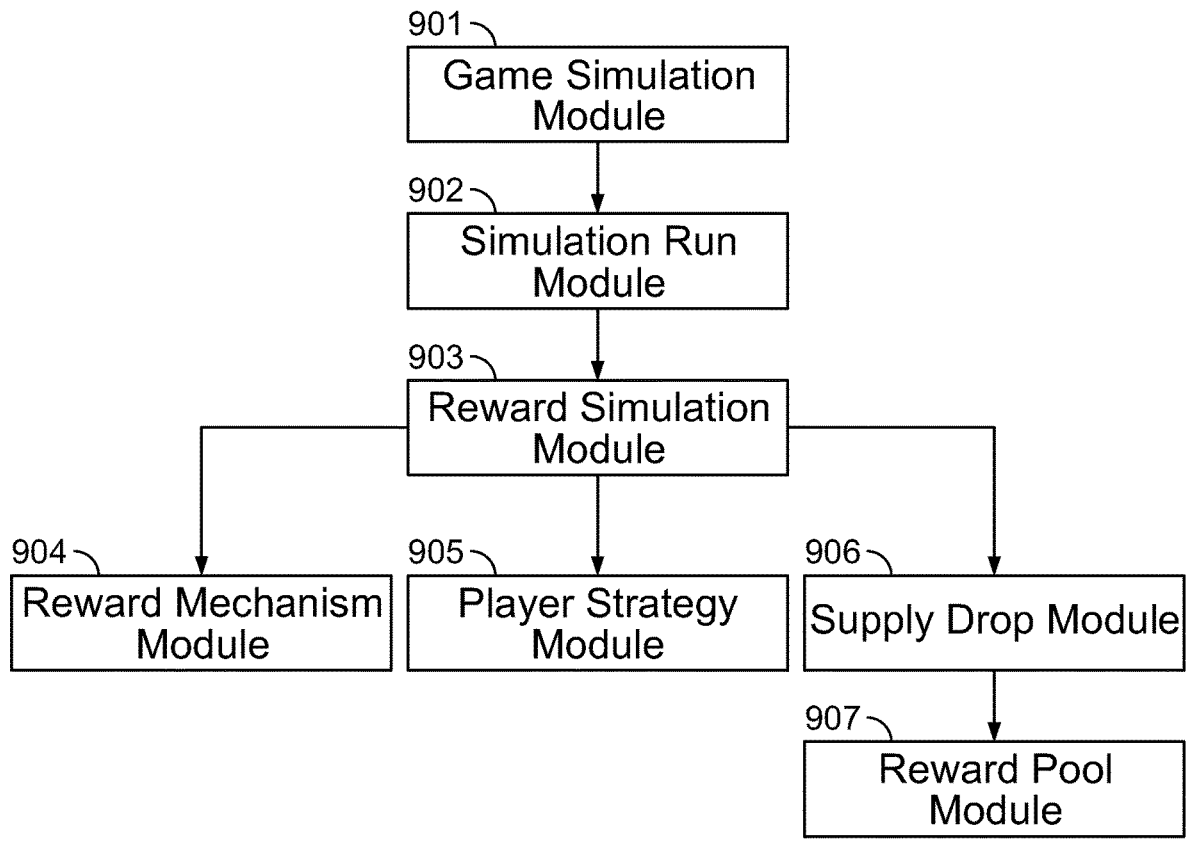
FIG. 9 illustrates exemplary software architecture for the simulation tool of the present specification, in accordance with one embodiment.

FIG. 9 illustrates an overall diagram of exemplary software architecture for the simulation tool of the present specification, which can be used for simulating a game environment and generating variables for reward acquisition and other aspects of a game, as described above. In one embodiment, the software architecture of the simulation tool comprises a number of software modules and sub-modules, each designed to carry out a specific set of functions. Referring to FIG. 9, various modules in the exemplary architecture include Game Simulation module 901, with a Simulation Run submodule 902; Reward Simulation module 903, with submodules for Reward Mechanism 904, Player Strategy 905 and Supply Drops 906; and a Reward Pool module 907.

In one embodiment, the Game Simulation module 901 performs the tasks for creating a framework for the simulation of game environment. Exemplary tasks performed by this module include creating an online user interface and populating it with default data and parameters which can be tuned by user. In one embodiment, these parameters include, but are not limited to counters for game items by type and rarity, the number of items available by type and rarity at specific days from game launch and player archetype parameters for defining playing and spending behavior of simulated players.

The Game Simulation module 901 also performs the basic tasks for running the simulation, such as initiating simulation run on user command, saving or restoring simulation settings, displaying key metric results in the user interface in graphical and/or textual form, and downloading inputs or results for the user in a desired format, such as a spreadsheet.

In one embodiment, the Game Simulation Module 901 is supported by a Simulation Run sub module 902, which collects parameters, data and counters from the user interface, which the user has defined or customized according to their preference. The sub module 902 executes the game simulation, and also generates statistics and creates charts and other graphical representations of the collected statistics.

The game simulation tool of the present specification further comprises a Reward Simulation Module 903, which obtains inputs from the Simulation Run sub module 902. Exemplary tasks performed by this module include creating a set of players for simulation, initializing inventory of items, initializing counters for reward generators, simulating matches for each player created and performing possible actions for the players, such as, but not limited to, collecting rewards, purchasing reward packs and crafting or dismantling items based on playing strategies. Reward Simulation module 903 also performs the tasks of logging match history for each simulated player and consolidating results across all players.

In one embodiment, when the Reward Simulation Module initializes counters for reward generators, it activates the reward generation logic in the Reward Mechanism sub module 904. The reward generation logic is used by the simulation tool to manage frequency, items and rarity for reward pack contents, and is based on user defined counters.

When simulating matches for players and performing actions for simulated players, such as purchasing, crafting or dismantling items based on playing strategies, the Reward Simulation Module 903 is supported by a Player strategy sub module 905, which executes the logic to enable simulated players to purchase supply drops or reward packs, create new weapons and dismantle items no longer required.

In one embodiment, the Reward Simulation Module 903 further interfaces with a Supply Drop sub module 906, which uses data from the Reward Simulation Module 903 and reward generation system to select contents of reward packs, based on current items in a simulated player's collection.

The Supply Drop sub module 906 interfaces with a Reward Pool module 907, in one embodiment. The Reward Pool module 907 uses input from the Supply Drop sub module 906 to manage lists of reward packs and tracks item availability at selected days from game simulation launch. The Reward Pool module, in one embodiment, further performs the task of randomly selecting a particular item to be included in a reward pack.

Figure 10A:
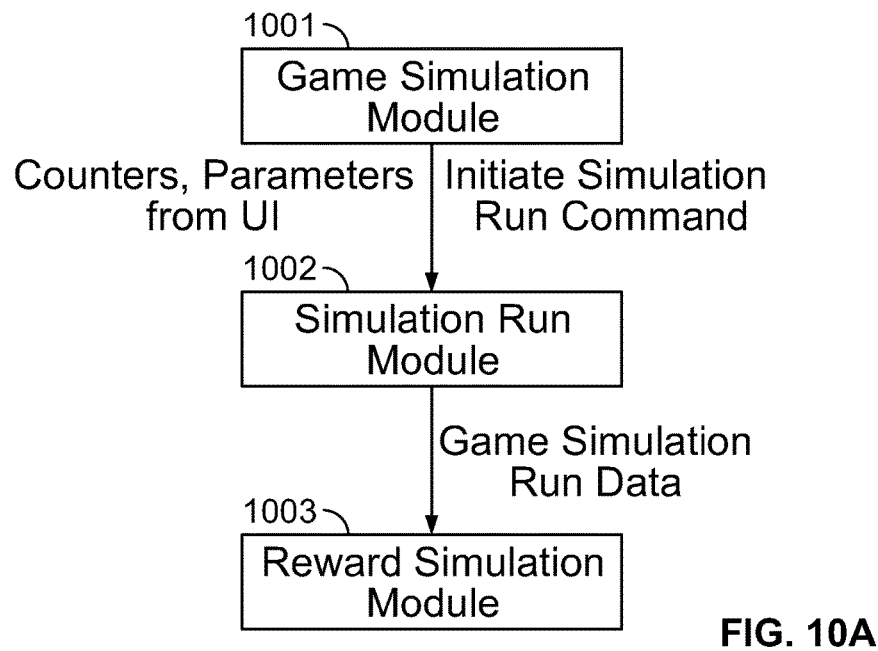
FIG. 10a illustrates the relationship between a subset of software modules shown in FIG. 9, according to one embodiment.
Figure 10B:
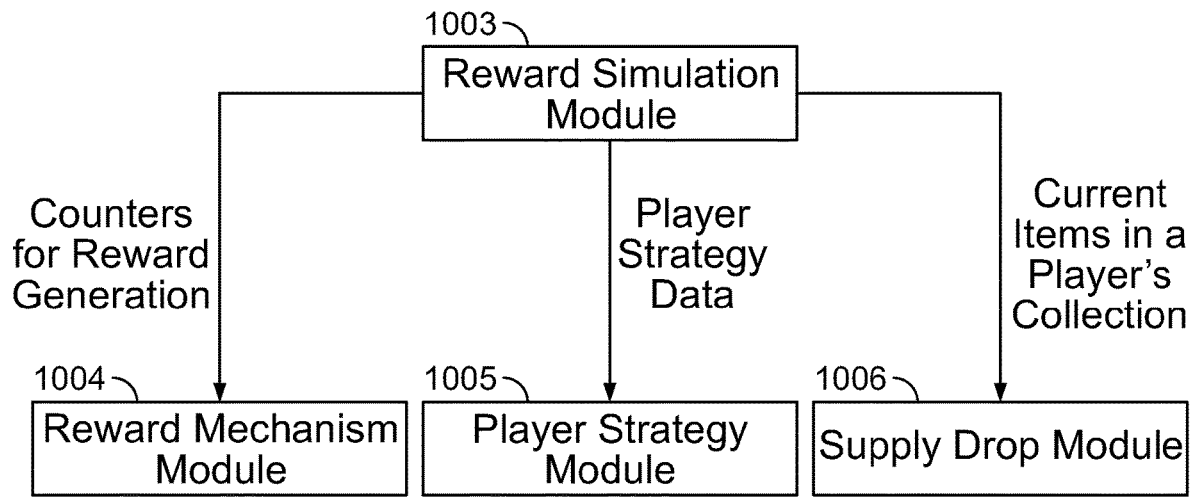
FIG. 10b illustrates the relationship between another subset of software modules shown in FIG. 9, according to one embodiment.
Figure 10C:
FIG. 10c illustrates the relationship between another subset of software modules shown in FIG. 9, in accordance with one embodiment of the present specification.

FIGS. 10a, 10b and 10c illustrate the relationship between individual software modules of FIG. 9. Referring to FIG. 10a, Game Simulation module 1001, as also explained above with reference to FIG. 9, creates online user interface and populates the interface with default data and parameters which can be tuned by user. These parameters include various counters for game items. In one embodiment, the Game Simulation module 1001 outputs counter and parameter data customized by the user, from the user interface to the Simulation Run sub module 1002. The Simulation Run submodule 1002 uses the counter and parameter data to run a game simulation, upon receiving an 'Initiate Simulation Run' command from the Game Simulation module 1001, and then to generate statistics for the simulation.

When the Simulation Run submodule 1002 runs a game simulation, it transmits simulation run data to the Reward Simulation module 1003, so that the latter may use the transmitted data to generate a set of players and to simulate matches for each player.

Referring to FIG. 10b, during a simulation run, the Reward Simulation module 1003 initializes counters for reward generators. This counter parameter data is supplied by the Reward Simulation module 1003 to the Reward Mechanism submodule 1004, which in one embodiment, executes reward generation logic to manage the frequency, item and rarity for reward pack contents based on counter parameter data, as described above.

As the Reward Simulation module 1003 simulates matches for each player, it also performs possible actions for the simulated player, which includes randomly determining or managing playing strategy for each player. As known to persons of ordinary skill in the art, playing strategies may include obtaining reward packs, accumulating or creating game items and/or discarding game items. In one embodiment, the Reward Simulation module 1003 provides strategy data for each player to the Player Strategy submodule 1005, which executes specific tasks for carrying out the strategy, such as for example, purchasing supply drops, crafting new weapons or dismantling game items.

As the Reward Simulation module 1003 manages playing strategy for each player, it also generates data regarding the game items and rewards acquired by each player. In one embodiment, data regarding each player's acquired items and rewards is output from the Reward Simulation module 1003 to the Supply Drop submodule 1006. The Supply Drop submodule uses data regarding existing items and rewards in a player's collection to determine the contents of reward packs generated further during the game simulation.

Referring to FIG. 10c, data delineating the contents of reward packs to be generated is output by the Supply Drop sub module 1006 to the Reward Pool module 1007. In one embodiment, based on the data from the Supply Drop submodule, the Reward Pool module 1007 further performs the task of randomly selecting a particular item to be included in a reward pack.

One of ordinary skill in the art would appreciate that the above described software architecture and its component modules are exemplary, and the number of modules and the tasks performed by each module may be designed in any manner suitable for optimally performing various functions associated with executing a game simulation by the tool of the present specification.

In the description and claims of the application, each of the words "comprise" "include" and "have", and forms thereof, are not necessarily limited to members in a list with which the words may be associated.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method for awarding virtual game items to a plurality of players in a multi-player video game, said method being implemented in a computer having a processor and a random access memory, wherein said processor is in data communication with a display and with a storage unit, the method comprising:

forming a pool of virtual game items in the computer, wherein each of said virtual game items belongs to a category;

establishing, in the computer, a lower boundary condition and an upper boundary condition for each category of said virtual game items;

for each of said plurality of players and during a multi-player video game session, selecting a value between said lower boundary condition and upper boundary condition for a given category of said virtual game items and associating said value to said category of said virtual game items;

for each of said plurality of players and during the multi-player video game session, modifying each of the selected values associated with each category of said virtual game items to yield, for each category, a modified value associated with each category of said virtual game items;

for each of said plurality of players and during the multi-player video game session, determining, for each category, if the modified value meets the lower boundary condition or the upper boundary condition; and for each of said plurality of players and during the multi-player video game session, if the modified value is less than or equal to the lower boundary condition or the modified value is greater than or equal to the upper boundary condition, awarding a virtual game item from the given category and if the modified value is greater than the lower boundary condition and less than the upper boundary condition allocating an alternative award.

2. The computer-implemented method of claim 1 wherein the multi-player video game session is a simulated multi-player video game session, said simulated multi-player video game session using historical player data to determine actions of each of said plurality of players.

3. The computer-implemented method of claim 2 further comprising generating a graphical user interface output of said simulated multi-player video game session, said graphical user interface output comprising
at least one of 1) a plot representing an average number of categories of items purchased or awarded as a function of a game number, 2) a histogram showing a distribution of when an average of said plurality of players obtained a first game item in the simulated multi-player video game session, 3) data representative of an accumulation of virtual game currency, 4) data representative of an acquisition of a number of each type of virtual game item, 5) data representative of a degree of rarity or commonness of virtual game items obtained, 6) data representative of a number of reward packs obtained by said plurality of players as a function of a number of simulated multi-player video game sessions played, or 7) data representative of a rarity or commonness of a number of reward packs obtained by said plurality of players as a function of a number of simulated multi-player video game sessions played.

4. The computer-implemented method of claim 3 further establishing modifying at least one of the lower boundary condition and the upper boundary condition for at least one category of said virtual game items based upon said graphical user interface output of said simulated multi-player video game session.

5. The computer-implemented method of claim 1 wherein said pool of virtual game items is formed based upon at least one of three value types.

6. The computer-implemented method of claim 5 wherein a first of said three value types is a value received by a player based upon a function of how long said player played a multi-player video game or a function of whether said player won or lost the multi-player video game.

7. The computer-implemented method of claim 5 wherein a second of said three value types is a value received by a player for completing a mission, a challenge, or other discrete objective or goal in a game.

8. The computer-implemented method of claim 5 wherein a third of said three value types is a value randomly received by a player.

9. The computer-implemented method of claim 5 wherein a third of said three value types is a value purchased by a player.

10. The computer-implemented method of claim 1 further comprising, for each of said plurality of players, for more than one category, if more than one of the modified values is less than or equal to the lower boundary condition or greater than or equal to the upper boundary condition, using the modified value that is closest to the lower boundary condition or upper boundary condition to award a virtual game item.

11. The computer-implemented method of claim 1 further comprising, for each of said plurality of players and during the multi-player video game session, after awarding a virtual game item from said one category, randomly selecting a new value between said lower boundary condition and upper boundary condition for said one category of said virtual game items and associating said new value to said one category of said virtual game items.

12. The computer-implemented method of claim 1 wherein said modifying each value is performed by decrementing said value by a predefined amount.

13. The computer-implemented method of claim 1 wherein said modifying each value is performed by incrementing said value by a predefined amount.

14. The computer-implemented method of claim 1 wherein the alternative award is virtual currency.

15. The computer-implemented method of claim 1 wherein the virtual game items comprise at least one of weapons, tools, cosmetic consumables, calling cards, emblems, or gear.

16. The computer-implemented method of claim 1 wherein the selecting a value between said lower boundary condition and upper boundary condition for a given category is random.

17. A multi-player video game system adapted to award virtual game items to a plurality of players, said multi-player video game comprising a processor and a computer memory, the computer memory comprising a plurality of programmatic instructions that, when executed by the processor:
form a pool of virtual game items in the computer, wherein each of the virtual game items belongs to a category of a plurality of categories;
establish a lower boundary condition and an upper boundary condition for each category of the plurality of categories;
for each of the plurality of players during a multi-player video game session, select a value bounded by a lower boundary condition and an upper boundary condition for a first category of the plurality of categories and associate the value to the first category;
for each of the plurality of players and during the multi-player video game session, modify the selected value associated with the first category to yield a modified value associated with the first category;
for each of the plurality of players and during the multi-player video game session, determine, for the first category, if the modified value meets the lower boundary condition or the upper boundary condition; and
for each of said plurality of players and during the multi-player video game session, if the modified value is less than or equal to the lower boundary condition or the modified value is greater than or equal to the upper boundary condition award a virtual game item from the first category and if modified value is greater than the lower boundary condition and less than the upper boundary condition, allocate an alternative award.

18. The multi-player video game system of claim 17 wherein the alternative award is virtual currency.

19. The multi-player video game system of claim 17 wherein the virtual game items comprise at least one of weapons, tools, cosmetic consumables, calling cards, emblems, or gear.

20. The multi-player video game system of claim 17 wherein, when executed by the processor, the plurality of programmatic instructions select the value between the lower boundary condition and the upper boundary condition randomly.

* * * * *